US009226183B2

(12) United States Patent
Huang et al.

(10) Patent No.: US 9,226,183 B2
(45) Date of Patent: Dec. 29, 2015

(54) REFERENCE SIGNAL MEASUREMENT

(71) Applicant: Telefonaktiebolaget L M Ericsson (publ), Stockholm (SE)

(72) Inventors: Jinliang Huang, Solna (SE); Ying Sun, Sundbyberg (SE); Yu Yang, Solna (SE); Lusheng Lucius Yu, Täby (SE); Huaisong Zhu, Beijing (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 142 days.

(21) Appl. No.: 13/908,500

(22) Filed: Jun. 3, 2013

(65) Prior Publication Data

US 2014/0355455 A1 Dec. 4, 2014

(51) Int. Cl.
*H04W 24/08* (2009.01)
*H04W 48/18* (2009.01)

(52) U.S. Cl.
CPC .............. *H04W 24/08* (2013.01); *H04W 48/18* (2013.01)

(58) Field of Classification Search
CPC ... H04W 24/08; H04W 52/24; H04W 52/241; H04W 52/242; H04W 52/243; H04W 52/245; H04W 28/048; H04W 56/0095; H04B 1/0465; H04B 1/10; H04B 1/1027; H04B 1/1036; H04B 1/1081; H04B 10/0795; H04B 10/07953; H04B 10/07955; H04B 17/0042; H04B 17/0055; H04B 17/006; H04B 7/0857
USPC .............. 370/252, 310, 310.2, 328, 338, 350; 455/501, 63.1, 67.13, 114.2, 135, 455/226.3, 277.2, 278.1, 283, 296
See application file for complete search history.

(56) References Cited

U.S. PATENT DOCUMENTS

| | | | | | |
|---|---|---|---|---|---|
| 4,584,869 | A | * | 4/1986 | Frodsham | 123/406.38 |
| 5,613,218 | A | * | 3/1997 | Li et al. | 455/71 |
| 5,994,690 | A | * | 11/1999 | Kulkarni et al. | 250/216 |
| 2009/0213743 | A1 | * | 8/2009 | Morinaga et al. | 370/252 |
| 2010/0309797 | A1 | * | 12/2010 | Lindoff et al. | 370/252 |
| 2014/0169209 | A1 | * | 6/2014 | Imamura et al. | 370/252 |
| 2014/0177531 | A1 | * | 6/2014 | Imamura et al. | 370/328 |

FOREIGN PATENT DOCUMENTS

EP 2538589 A1 12/2012
WO 2013035052 A2 9/2012

OTHER PUBLICATIONS

Leon Cohen, The History of NOise, Nov. 2005, IEEE Signal Processing Magazine, p. 20-45.*
Huang, S-C., et al., "Novel Channel Estimation Techniques on SC-FDMA Uplink Transmission", IEEE 71st Vehicular Technology Conference, May 16, 2010, pp. 1-5, IEEE.
Koivisto, T., et al., "Reference Signal Design for Flexible MIMO Operation in LTE-Advanced Downlink", IEEE 71st Vehicular Technology Conference, May 16, 2010, pp. 1-5, IEEE.

* cited by examiner

*Primary Examiner* — Noel Beharry
*Assistant Examiner* — Rodrick Mak
(74) *Attorney, Agent, or Firm* — Coats & Bennett, PLLC

(57) ABSTRACT

The embodiments disclosed relates to a method and a network node that estimates a signal power and/or noise power of a received reference signal. The receiving node may operate in a communications system applying frequency division multiplexing. An assumption is that the channel frequency responses, on adjacent subcarriers of the communications system are equivalent or constant. The method comprising receiving a reference signal comprising a first reference signal from a first wireless terminal and a second reference signal from a second wireless terminal By using this assumption it is possible to combine first and second reference signal in order to estimating the signal power and/or noise power of a received reference signal without a conventional channel estimation technique.

8 Claims, 7 Drawing Sheets

REFERENCE SIGNAL MEASUREMENT

TECHNICAL FIELD

Embodiments herein relate to a network node and a method therein. In particular, it relates to estimating a signal power and/or noise power of a received reference signal.

BACKGROUND

Reference signals such as Sounding Reference Symbols (SRS) are transmitted on the uplink by for example a wireless terminal (WT) so that a network node such as eNodeB (eNB) can estimate the signal strength or quality at different antennas of the network node with relation to the reference signal. The estimate can be used to do receiving point selection in uplink (UL) multi-sector cell, where a receiving point refers to a sector that is equipped with a number of RX antennas.

Multi-sector cell, also called merged cell or shared cell in some cases, is a new cell configuration for LTE and enables a multi Radio Remote Unit (RRU) deployment without needing to care about cell planning from a Radio Frequency (RF) perspective. It is achieved by allowing the different RRUs using the same Physical Cell Identity (PCI) and thus all RRUs are considered, by the WT, to be part of the same cell. The spatially separated RRU or a group of RRUs are called sector. A cell can contain multiple sectors, and a WT can belong to one sector or multiple sectors depending on the WT position.

Different from a basic LTE cell configuration where all WTs camped in that cell shall share cell resources by time and/or frequency multiplexing, in a multi-sector cell, yet another resource domain, spatial resource, is also introduced. Some WTs that are spatially separated can use the same time and frequency resource, but on different sectors. On the other hand, where a WT's transmission can be detected in several sectors, receiving point selection is used in order to obtain macro diversity gain. To be able to determine if several WTs can use the same time and frequency resource, or if receiving point selection is to be used, the eNB must has the knowledge of signal quality of all WTs that are received by every sector, which can be obtained from sounding reference signals SRS. By computing the difference of the received signal power from SRSs, the isolation degree among different sectors is defined. The degree of isolation is further used as criteria to determine if several WTs are interfered with each other or if they are co-scheduled in the same time and frequency resource but in different sectors.

Different WTs can be assigned with a separate SRS resource in the same cell. The separation can be achieved by for example any one or more of, time division multiplexing (TDM), frequency division multiplexing (FDM), and code division multiplexing (CDM). If the WTs are separated by TDM or FDM, they will not cause any interference to each other. If CDM is used, the interference from other WTs is inevitable. In the case of multi-cell scenario, interference may also come from neighboring cell, and thanks to SRS signal design, this neighboring cell's SRS can be viewed as white noise.

Conventional technique for measurement in SRS is based on channel estimation. Channel estimation usually includes a matched filtering, Inverse Fast Fourier Transform (IFFT), noise suppression, and Fast Fourier Transform (FFT), which is computationally intensive. Furthermore, the amount of Digital Signal Processing (DSP) resources that can be allocated to SRS is limited due to the additional support for the Physical Uplink Shared CHannel (PUSCH) and Physical Uplink Control CHannel PUCCH. The problem with the computational intense channel estimation becomes even worse in a multi-sector scenario, where a signal from a WT is received by antennas from all sectors and the channel estimation needs to be done on each receive antenna. The problem becomes even more severe as the system capacity is limited dramatically when there is a large number of sectors configured with the same cell ID. One example is the requirement of combining 144 sectors into one cell In J. Chang et al, "Apparatus and method for estimating interference and noise in a communication system", November 2009, a generic method for OFDM applications that estimates the signal power and interference plus noise power was proposed by assuming similar channel characteristics between adjacent sub-carriers in order to reduce the computational complexity. This method can be applied to SRS measurement. However, the method only deals with one signal source and not signals from multiple interfering sources.

SUMMARY

It is therefore an object of embodiments herein to provide an improved way of estimating a signal power and/or noise power of a received reference signal that is subjected to interference from multiple interfering sources.

According to a first aspect of embodiments herein, the object is achieved by a method for use in a receiving node of a communications system applying frequency division multiplexing, for estimating a signal power and/or noise power of a received reference signal. The method comprising: receiving a reference signal comprising a first reference signal from a first wireless terminal and a second reference signal from a second wireless terminal; determining at least three sub-carriers on which the first and second reference signal is received; for each sub-carrier of the determined sub-carriers, multiplying the reference signal with a conjugate based on the second reference signal to form a first resulting signal; adding the first resulting signals sequentially pairwise to form at least two second resulting signals; adding the second resulting signals sequentially pairwise to each other to obtain at least a third resulting signal; and estimating the signal power and/or noise power of the first or second reference signal based on the third resulting signal, the second resulting signal and the reference signal.

According to a second aspect of embodiments herein, the object is achieved by a method for use in a receiving node of a communications system applying frequency division multiplexing, for estimating a signal power and/or noise power of a received reference signal. The method comprising: receiving a reference signal comprising a first reference signal from a first wireless terminal and a second reference signal from a second wireless terminal; determining at least two subcarriers on which the first and second reference signal is received; for each sub-carrier of the determined sub-carriers, multiplying the reference signal with a conjugate based on the second reference signal to form a first resulting signal and multiplying the reference signal with a conjugate based on the first reference signal to form a second resulting signal; adding the first resulting signals sequentially pairwise to form at least one third resulting signal and adding the second resulting signals sequentially pairwise to form at least one fourth resulting signal; and estimating the signal power and/or noise power of the first or second reference signal based on the at least third resulting signal, the at least fourth resulting signal and the reference signal.

According to a third aspect of embodiments herein, the object is achieved by a receiving node for use in a communications system applying frequency division multiplexing, configured to estimate a channel between the receiving node and a first transmitting node, the receiving node comprising a processing circuit and receiver. The receiver is configured to receive a reference signal comprising a first reference signal from a first wireless terminal and a second reference signal from a second wireless terminal. The processing circuit is configured to determine at least three sub-carriers on which the first and second reference signal is received. For each sub-carrier of the determined sub-carriers, the processing circuit is configured to multiply the reference signal with a conjugate based on the second reference signal to form a first resulting signal. The processing circuit is configured to add the first resulting signals sequentially pairwise to form at least two second resulting signals. The processing circuit is configured to add the second resulting signals sequentially pairwise to each other to obtain at least a third resulting signal. The processing circuit is configured to estimate the signal power and/or noise power of the first or second reference signal based on the third resulting signal, the second resulting signal and the reference signal.

According to a fourth aspect of embodiments herein, the object is achieved by a receiving node for use in a communications system applying frequency division multiplexing, configured to estimate a channel between the receiving node and a first transmitting node, the receiving node comprising a processing circuit and a receiver. The receiver is configured to receive a reference signal comprising a first reference signal from a first wireless terminal and a second reference signal from a second wireless terminal. The processing circuit is configured to determine at least two subcarriers on which the first and second reference signal is received. For each sub-carrier of the determined sub-carriers, the processing circuit is configured to multiply the reference signal with a conjugate based on the second reference signal to form a first resulting signal and to multiply the reference signal with a conjugate based on the first reference signal to form a second resulting signal. The processing circuit is configured to add the first resulting signals sequentially pairwise to form at least one third resulting signal. The processing circuit is configured to add the third resulting signals sequentially pairwise to form at least one fourth resulting signal. The processing circuit is configured to estimate the signal power and/or noise power of the first or second reference signal based on the at least third resulting signal, the at least fourth resulting signal and the reference signal.

The above embodiments propose a general method for estimating signal power and/or noise power of uplink reference signals measurement. It simplifies the measurement procedure by not performing real channel estimation, which includes FFT/IFFTs as described above. Instead, combinations of the received reference signal are done to cancel out the unwanted signals and hence obtain the noise power and signal power. With the application of this method is simplifies the, 1. Selection of WTs that can be paired for MU-MIMO. From spectrum efficiency point of view, it is beneficial to combine several (usually two) WTs so that they can transmit on the same time slot and frequency. Usually, the combined WTs have similar SNR so that the interference caused by other WTs does not have much impact on the desired signal. The SNR can be estimated beforehand by SRS measurement.
2. Receiving point selection for intra-site UL CoMP, where received signal from different cells can be combined to further enhance the performance. To decide which cells to be selected for combination, signal quality measurement is needed and this can be obtained from SRS.

BRIEF DESCRIPTION OF THE DRAWINGS

Examples of embodiments herein are described in more detail with reference to attached drawings in which.

DETAILED DESCRIPTION

The following embodiments of this application may be performed in the following scenario even though the described embodiments are applicable to other scenarios where it is necessary to estimate signal strength or noise in a received reference signal. As described in the background the computational burden increases when the number of reference signals to estimate increases. Below and in reference to FIG. 1 an example scenario with a multi-sector cell is described. The embodiments described herein is not limited to this specific scenario but may be used in any system where an efficient estimation of signal and/or noise power is required using a reference signal as input.

Figure 1:
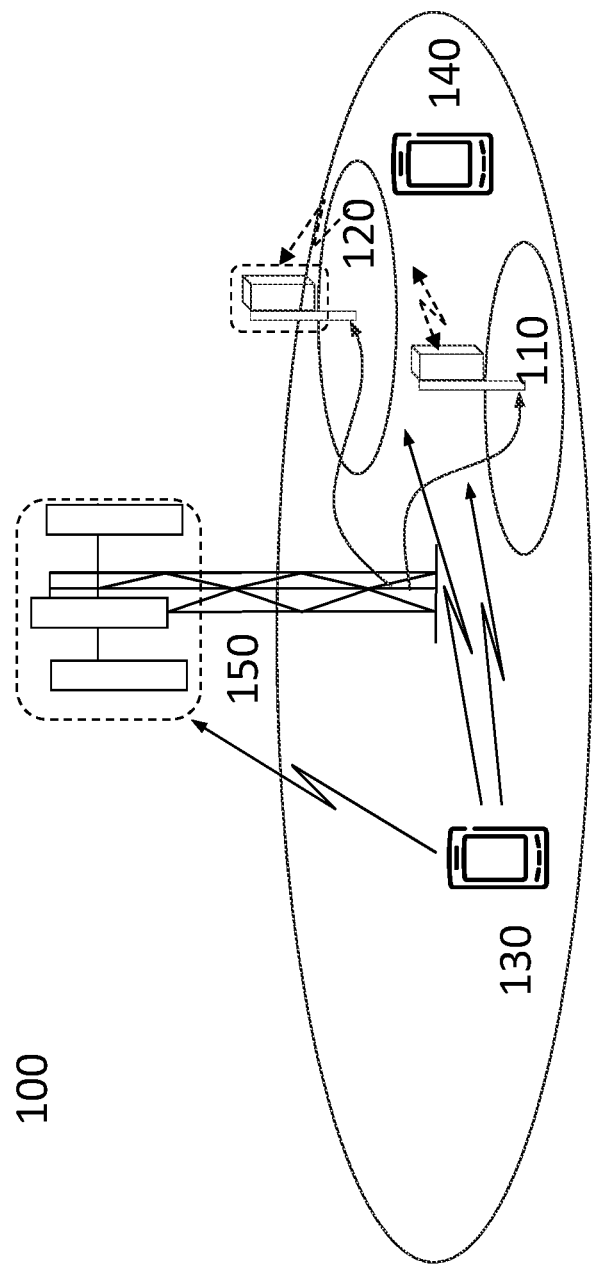
FIG. 1 is a schematic block diagram illustrating a wireless communication network with an exemplary scenario.

A part of a wireless communications network 100 is depicted in FIG. 1 in which embodiments herein may be implemented. Examples of such a wireless communication network are LTE, WCDMA, GSM network, any 3GPP cellular network, Wimax, or any other cellular network or system. In the following LTE is used merely as an exemplifying standard to illustrate the main concept.

The wireless communication network 100 comprises one or more cells. In FIG. 1, a base station 150 is serving a first cell 220 which is referred to in the figure as the macro sector. The base station 150 is a network node and may be e.g. a Radio Base Station, RBS, which sometimes may be referred to as e.g. an eNB, eNodeB, NodeB, B node, or Base Transceiver Station, BTS, depending on the technology and terminology used. Also shown in FIG. 1, are two pico nodes 110, 120 each covering a respective cell. The pico nodes may also be referred to as pico base stations. The pico nodes 110, 120 may have the same functionality as the base station 150 but are primarily defined by having lower transmission power and thereby also covering a smaller cell.

A first wireless terminal (WT) 130 and a second WT 140 is located in the first cell. The first wireless terminal 130 and the second WT 140 may be served by anyone of the nodes 110, 120, 150 or several of these nodes. The first wireless terminal 130 and the second WT 140, depicted in FIG. 1, may further be referred to as mobile telephone, user equipment, cellular telephone, communication device or laptop with wireless capability, just to mention some further examples. The first WT 130 and the second WT 140 in the present context may be, for example, portable, pocket-storable, hand-held, computer-comprised, vehicle-mounted mobile device, or any device enabled to communicate voice and/or data, via the RAN, with another entity, such as another wireless terminal or a server.

A first example scenario is where the base station 150 and the first 110 and second pico node 120 form a multi sector where the transmission from first WT 130 is received in all three points. A second example scenario is that the first WT 130 communicates with the base station and the second WT 140 communicates with the first and/or second pico node using the same resources thereby achieving reuse of the radio resources. What these scenarios have in common is that they all require a large amount of estimations of the signal and noise received in all base stations, picos as well as macros, in order to be efficient.

If there is only one WT transmitting SRS, the method proposed in J. Chang et al, "Apparatus and method for estimating interference and noise in a communication system", November 2009 can be used to estimate the signal power. But this method cannot be used in the following scenarios when there are more than 1 WTs.

However, when there are multiple WTs that are interfering with each other, the methods described below might be used to reduce the computational complexity or a combination of the proposed methods and traditional method is used to tradeoff between the complexity and accuracy.

Figure 2:
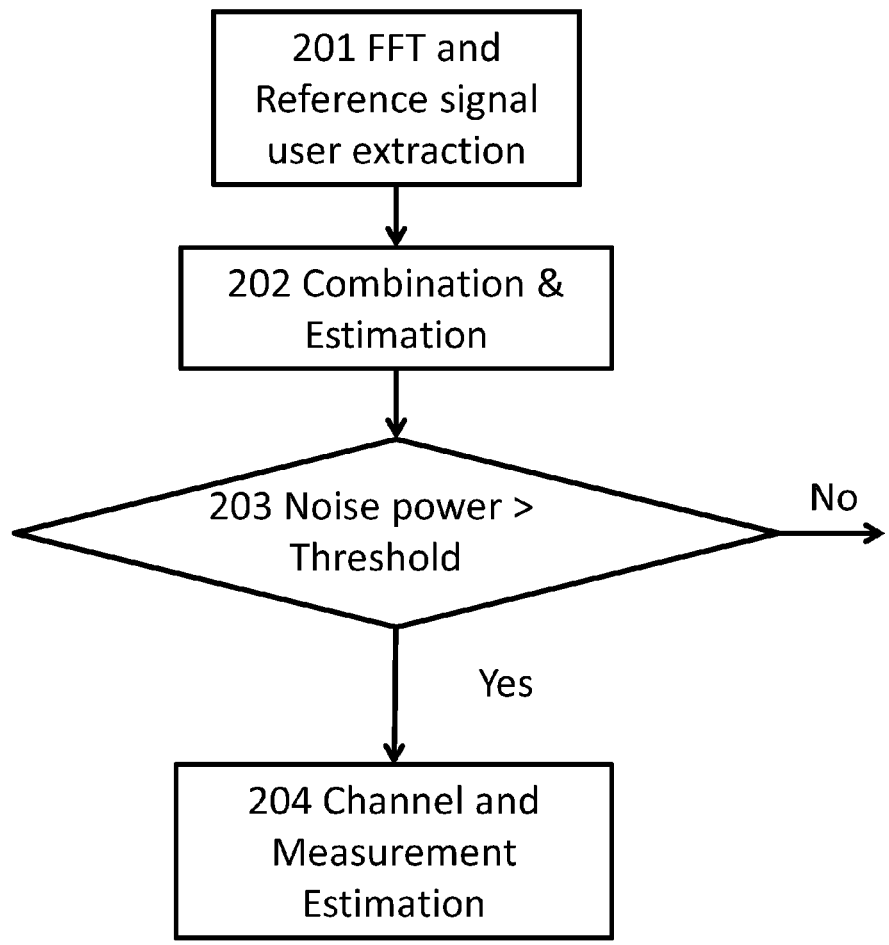
FIG. 2 is a flowchart illustrating embodiments of a method in a network node.

In order to describe the proposed methods of estimating of the signal and/or noise power it is necessary to put these methods in a context. This is done in relation to FIG. 2. FIG. 2 therefore shows an example setting in which the estimation of the signal and/or power may be performed. Please note that the term base station and cell is used interchangeably unless specifically discussed.

The embodiments disclosed herein are suggested to estimate signal power and noise power for SRS measurement. An assumption is that the channel frequency responses, H, on adjacent subcarriers are equivalent or constant or can be considered to be equivalent or constant, e.g, H(i)=H(i+2), where i is the subcarrier index. The above example holds for an LTE system. It also possible to assume that H(i)=H(i+1) for other systems where the SRSs are transmitted on every subcarrier.

This method can be viewed as a complement to the existing process of handling the reception of SRS and it is used when only the signal power and/or noise power is needed instead of detailed channel impulse response for example in the scenarios described above where the amount of SRS signaling becomes high. The general processing flow is shown in FIG. 2. After the reference signal (which could be a SRS) is extracted using a conventional FFT output 201, the herein disclosed methods can be used to combine the signal in a certain way and estimate the signal and noise power directly based on the combination results 202. The details of this method will be described in more detail below. In one embodiment, if the estimated noise power is higher than a certain threshold 203, a traditional or conventional channel estimation is applied to estimate the signal power instead 204. Additional details on action 203 will follow in more detail below.

If there are two WTs that are transmitting and interfering with each other either the first or second embodiment described below can be used to estimate the signal and/or noise power. If there are three or more WTs that are transmitting and interfering with each other, the traditional channel estimation could be applied before the proposed method to estimate the channel response and signal power. Then the contributions of those WTs are subtracted from the received signal and, for the remaining two WTs, the method of estimating signal and noise can be applied as shown in FIG. 2. With two WTs remaining either the first or second embodiment described below can be used estimate the signal and/or noise power.

As described above, in relation to action 203 there might be times when there is an alternative not to use either of the proposed methods to estimate the signal power and/or noise power of a reference signal, as described in the preceding paragraphs. It is thus an alternative when the estimated noise power is higher than a threshold, that a conventional channel estimation is applied to estimate the signal power. Or in other words, that the proposed method is not used for estimating the signal power but rather a conventional and thus more complex estimation technique.

Accordingly, in very low SNR scenario, e.g. −10 db, the signal power estimation error could be high. This is not acceptable in cases that need good signal power estimation in low SNR. One solution is to set a threshold $N_{thres}$ such as, $$2\sigma_{n,1}^2 \Big/ \left( \frac{1}{N_{sc}^{rb}N_{rb}/2 - 1} \sum_{i=0}^{N_{sc}^{rb}N_{rb}-4} |Y_1(i)|^2 \right) < N_{thres},\ 0 < N_{thres} < 1$$

where $\sigma_{n,1}^2$ is the noise power, $N_{sc}^{rb}$ is the number of subcarriers per RB, e.g. 12, $N_{rb}$ is the number of resource blocks, RBs and Y(i) defined below.

When this threshold is reached, the signal power estimation error might be high. Then conventional channel estimation could be used for signal power estimation. Also, when the estimated noise power is higher than a threshold, e.g. as described above, a time domain filtering is applied to the estimated signal power.

Now the a first and a second embodiment will be described of estimating the signal and/or noise power directly First Embodiment In a first scenario there are two WTs' SRSs transmitted at the same time slot and frequency:

$$Y(i)=H_1(i)X_1(i)+H_2(i)X_2(i)+n$$

where i=0, 2, . . . , $N_{sc}^{rb}N_{rb}-2$ $H_1$ is the channel associated with the first WT 130 and $X_1$ is the SRS transmitted by first WT 130. $H_2$ and $X_2$ are channel and SRS associated with the second WT 140. $N_{rb}$ is the total number of resource blocks RBs used by the first WT 130 that are interfered by the second WT 140, and $N_{sc}^{rb}$ is the number of subcarriers per RB. The second WT 140 can be a user in the same cell/sector or from a neighboring cell/sector. As it is the same node, e.g. the base station 150, the first pico node 110 or second pico node 120 that processes the two WTs, it is assumed that the information of $X_1$ and $X_2$ is available.

Figure 3:
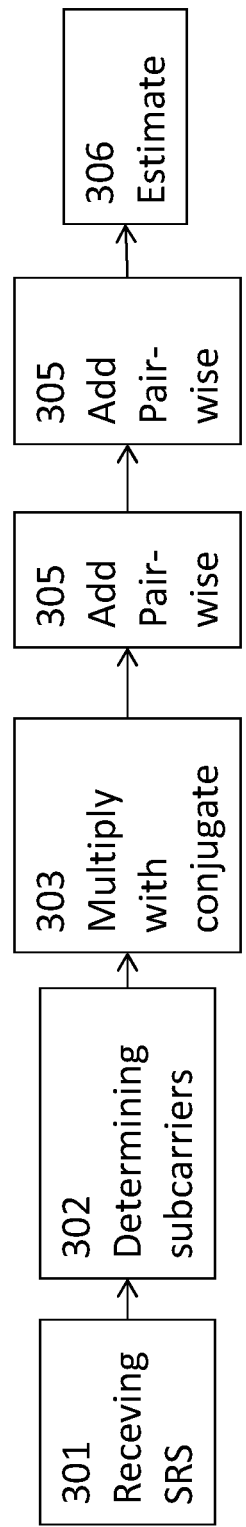
FIG. 3 is a flowchart illustrating embodiments of a method in a network node.
Figure 4:
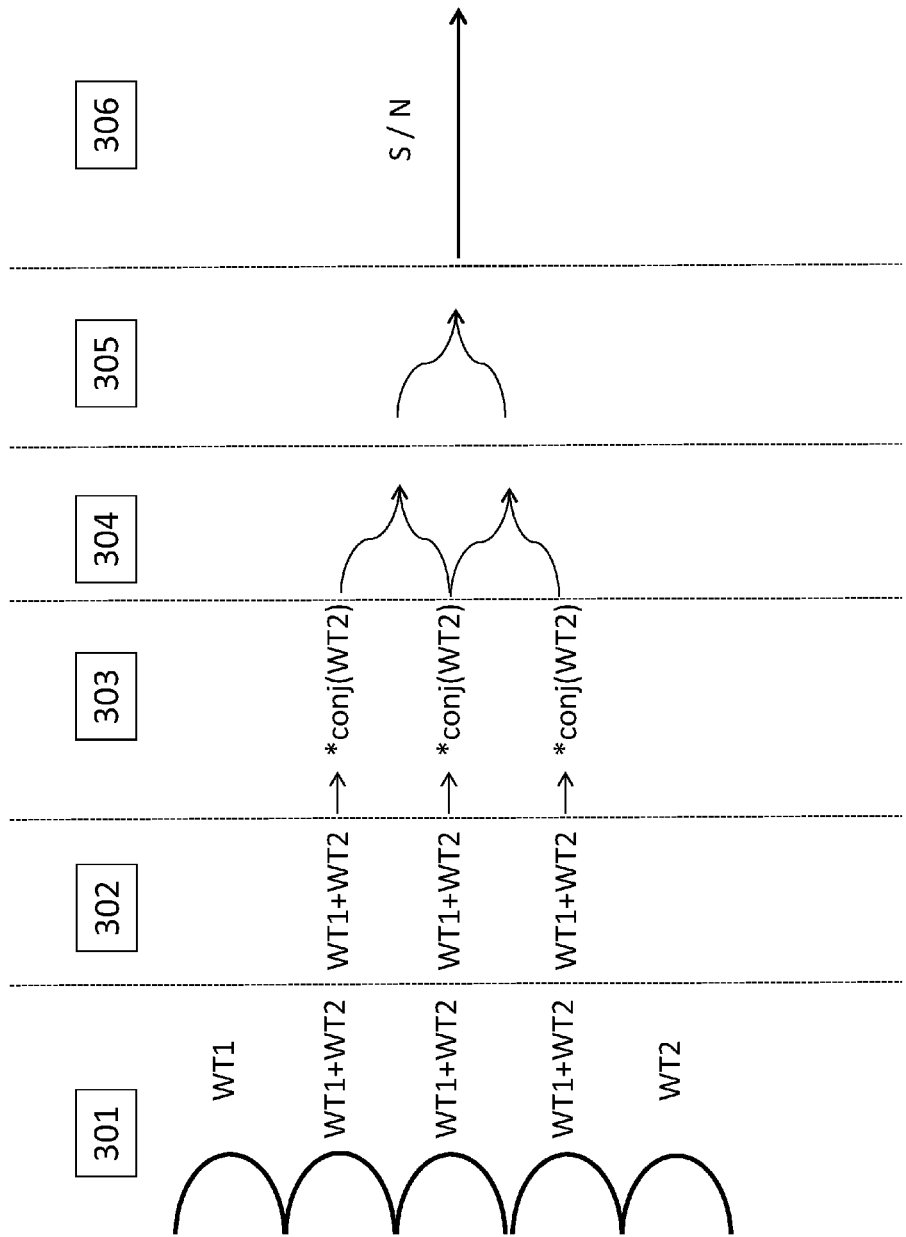
FIG. 4 is a schematic diagram illustrating embodiments of a method.

In the following a method for use in a receiving node 301, such as the base station 150, the first pico node 110 or second pico node 120, of a communications system applying frequency division multiplexing, for estimating a signal power and/or noise power of a received reference signal is disclosed in reference to FIGS. 3 and 4. To be able to reduce the computational complexity the first method comprises the following actions, which actions may be taken in any suitable order.

Action 301

The receiving node receives reference signals such as SRSs from two wireless terminals WT such as the first WT 130 and second WT 140. Each WT that transmits a reference signal occupies a predetermined bandwidth or equally a predetermined number of subcarriers. The receiving node receives 301 a reference signal comprising a first reference signal from a first wireless terminal and a second reference signal from a second wireless terminal. Because the first and second WT transmits in the same time slot and frequency they are combined in the air and form the reference signal.

Action 302

In order to take advantage of the fact that two adjacent subcarriers experiences almost the same channel characteristics, it is necessary to determine 302 at least three sub-carriers on which the first and second reference signal is received. The determined subcarriers are also preferably close to each other in term of subcarrier index or adjacent. As depicted in FIG. 4 it is not necessary that both WT transmit the reference signal in exactly the same subcarriers but it is sufficient that they have at least three subcarriers in common.

Action 303

Having determined which subcarriers to use and in order to remove interference we should for each sub-carrier of the determined sub-carriers, multiply (303) the reference signal with a conjugate based on the second reference signal to form a first resulting signal.

Mathematically this is described by the following steps:
Multiply the received signal on every determined subcarrier with $conj(X'_2(i))$, where $X'_2(i)$ is $$X'_2(i) = X_2(i) * \exp\left(-j\pi\frac{i}{2}\right);$$

where i is the sub-carrier index and j is the imaginary unit. The first resulting signal is then obtained as:

$$\hat{Y}_1(i) = conj(X'_2(i))Y(i) = H_1(i)M_1(i) + H_2(i)(-1)^{\frac{i}{2}} + \hat{n}_1(i)$$

Action 304

Having multiplied the reference signal with a conjugate based on the second reference signal to form a first resulting signal, the interfering signal from the second WT 140 is removed by adding 304 the first resulting signals sequentially pairwise to form at least two second resulting signals. Assuming that the channel remains constant i.e. assuming the same channel over three adjacent subcarriers, i,i+2,i+4, we get:

$$\hat{Y}_1(i) = H_1(i)M_1(i) + H_2(i)(-1)^{\frac{i}{2}} + \hat{n}_1(i)$$
$$\hat{Y}_1(i+2) = H_1(i)M_1(i+2) + H_2(i)(-1)^{\frac{i+2}{2}} + \hat{n}_1(i+2)$$
$$\hat{Y}_1(i+4) = H_1(i)M_1(i+4) + H_2(i)(-1)^{\frac{i+4}{2}} + \hat{n}_1(i+4)$$

where $M_1(i) = conj(X'2(i))X_1(i)$.

By adding every two neighboring equations, where neighboring equations refers to the equations describing the received signal on adjacent subcarriers, the SRS contribution from the second WT 140 is cancelled out, $$Y_1(i) = \hat{Y}_1(i) + \hat{Y}_1(i+2) = H_1(i)\underbrace{(M_1(i) + M_1(i+2))}_{A_1(i)} + \underbrace{\hat{n}_1(i) + \hat{n}_1(i+2)}_{N_1(i)}$$

$$Y_1(i+2) =$$

$$\hat{Y}_1(i+2) + \hat{Y}_1(i+4) = H_1(i)\underbrace{(M_1(i+2) + M_1(i+4))}_{A_1(i+2)} + \underbrace{\hat{n}_1(i+2) + \hat{n}_1(i+4)}_{N_1(i+2)}$$

Action 305

To determine the noise part of the received reference signal we add 305 the second resulting signals sequentially pairwise to form at least a third resulting signal. Mathematically this is done by adding or combining $Y_1(i)$ and $Y_1(i+2)$ to in order to remove the signal part of the first WT 130:

$$\tilde{Y}_1(i) = A_1(i+2)Y_1(i) - A_1(i)Y_1(i+2)$$
$$= A_1(i+2)N_1(i) - A_1(i)N_1(i+2)$$
$$= A_1(i+2)\hat{n}_1(i) + (A_1(i+2) - A_1(i))\hat{n}_1(i+2) - A_1(i)\hat{n}_1(i+4)$$

Thus the signal part of the first WT 130 is completely removed and the noise power can be obtained from the mean power of $\tilde{Y}_1(i)$ Action 306

Having removed all signal parts of both the first WT 130 and the second WT 140 of the received reference signal we can estimate 306 the signal power and/or noise power of the first or second reference signal based on the third resulting signal, the second resulting signal and the received reference signal.

This may be achieved by first estimating the noise of the third resulting signal $\tilde{Y}_1(i)$ as follows $$\sigma_{n,1}^2 = \frac{1}{N_{sc}^{rb}N_{rb}/2 - 2} \sum_{i=0}^{N_{sc}^{rb}N_{rb}-6} \frac{|\tilde{Y}_1(i)|^2}{|A_1(i+2)|^2 + |A_1(i)|^2 + |A_1(i+2) + A_1(i)|^2}$$

Because the Zad-off Chu sequence has normalized power, the noise power $\sigma_{n,1}^2 = \sigma_n^2$. Furthermore, $\sigma_{N_1}^2 = 2\sigma_n^2$. $\sigma_n^2$ is the variance of the original noise n from the received reference signal. $\sigma_{n,1}^2$ is the variance of noise term $\hat{n}_1$, which is a transform of n. $\sigma_{N_1}^2$ is the variance of the aggregated noise $N_1$.

By plugging the noise variance into the e.g the first resulting signal $Y_1(i)=H_1(i)A_1(i)+N_1(i)$, and rewritten to only have the noise part left $$Y'_1(i) = \frac{1}{A_1(i)}Y_1(i) = H_1(i) + \frac{1}{A_1(i)}N_1(i)$$

where $i=0, 2, \ldots, N_{sc}^{rb}N_{rb}-4$ the signal power can be calculated as $$\sigma_{H_1}^2 = \frac{\sum_{i=0}^{N_{sc}^{rb}N_{rb}-4} |Y'_1(i)|^2 - \sigma_{N_1}^2 \sum_{i=0}^{N_{sc}^{rb}N_{rb}-4} \left|\frac{1}{A_1(i)}\right|^2}{N_{sc}^{rb}N_{rb}/2 - 1}$$

$$= \frac{\sum_{i=0}^{N_{sc}^{rb}N_{rb}-4} |Y'_1(i)|^2 - 2\sigma_n^2 \sum_{i=0}^{N_{sc}^{rb}N_{rb}-4} \left|\frac{1}{A_1(i)}\right|^2}{N_{sc}^{rb}N_{rb}/2 - 1}$$

In addition it can be proved that when there are two WTs that are within the same cell using different cyclic shift, and they are completely overlapped in the frequency bandwidth, $|A_1(i)|$ is a constant number that is independent of i. i.e., $|A_1(i)|=|A|$ for all i, the equation can be simplified as $$\sigma_{H_1}^2 = \frac{\sum_{i=0}^{N_{sc}^{rb}N_{rb}-4}|Y_1'(i)|^2}{N_{sc}^{rb}N_{rb}/2-1} - \frac{1}{|A_1|^2}2\sigma_n^2$$

The signal power of the second WT 140 is:

$$\sigma_{H_2}^2 = P_{tot} - \sigma_{H_1}^2 - \sigma_n^2,$$

where $P_{tot}$ is the total received signal power.

Second Embodiment

In a second scenario when there are three or more WTs' SRSs transmitted at the same time slot and frequency we can select N−2 WTs for real channel estimation, but these WT should be selected in a way that the remaining 2 WTs fulfill the requirement that $|CS_1 - CS_2| \neq 4$ where CS is the cyclic shift of the respective WT. Then we subtract the contribution of the selected WTs from the received signal as follows:

$$\breve{Y}(i) = Y(i) - \hat{H}_3(i)X_3(i) - \ldots - \hat{H}_N(i)X_N(i) = H_1(i)X_1(i) + H_2(i)X_2(i) + n$$

where $i = 0, 2, \ldots, N_{sc}^{rb}N_{rb} - 2$

Figure 5:
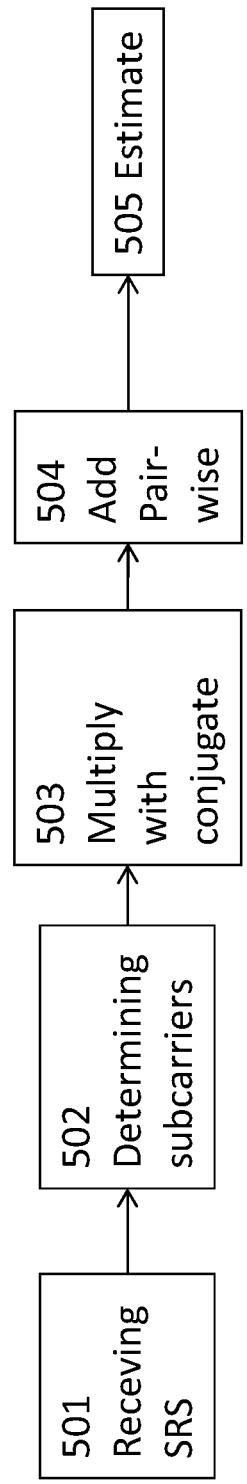
FIG. 5 is a flowchart illustrating embodiments of a method in a network node.
Figure 6:
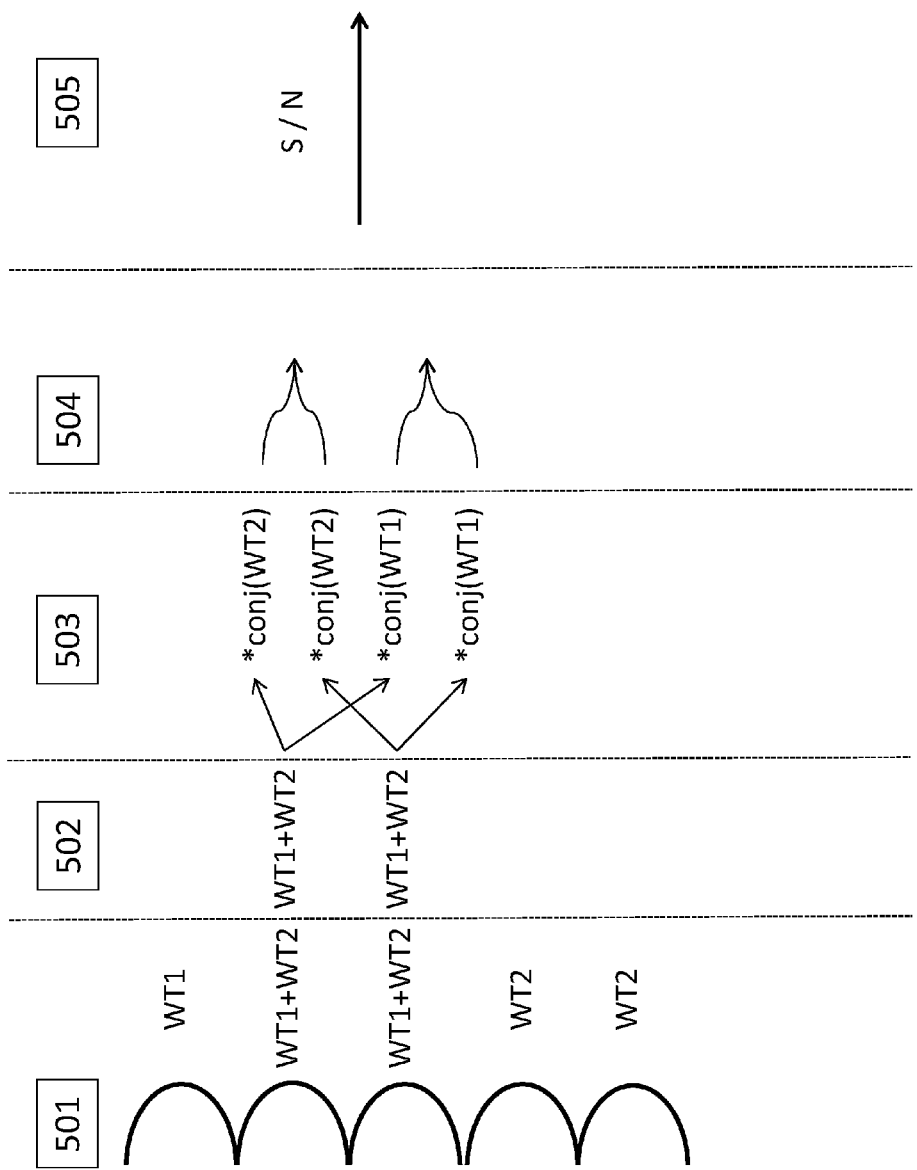
FIG. 6 is a schematic diagram illustrating embodiments of a method.

In the following a method for use in a receiving node of a communications system applying frequency division multiplexing, for estimating a signal power and/or noise power of a received reference signal, is disclosed in reference to FIGS. 5 and 6. The method allows estimating the signal power and/or noise power for the remaining selected two WT e.g. the first WT 130 and the second WT 140. To be able to reduce the computational complexity the second method comprises the following actions, which actions may be taken in any suitable order Action 501

The receiving node receives reference signals from the two selected wireless terminals e.g. the first WT 130 and the second WT 140. Each WT that transmits a reference signal occupies a predetermined bandwidth or equally a predetermined number of subcarriers. The receiving node receives 501 a reference signal comprising a first reference signal from a first WT 130 and a second reference signal from a second WT 140. Because the first and second WT transmits in the same time slot and frequency they are combined in the air and form the reference signal.

Action 502

In order to take advantage of the fact that two adjacent subcarriers experiences almost the same channel characteristics, it is necessary to determine 502 at least two subcarriers on which the first and second reference signal is received. The determined subcarriers are also preferably close to each other in term of subcarrier index or adjacent. As depicted in FIG. 6 it is not necessary that both WT transmit the reference signal in exactly the same subcarriers but it is sufficient that they have at least two subcarriers in common.

Action 503

Having determined which subcarriers to use and in order to remove interference we should for each sub-carrier of the determined sub-carriers, multiplying 503 the received reference signals with a conjugate based on the second reference signal to form a first resulting signal. We should also multiply the same reference signal with a conjugate based on the first reference signal to form a second resulting signal.

A formal mathematical description is to multiply the received signal on every subcarrier with $conj(X'_2(i))$, where $X'_2(i)$ is $$X'_2(i) = X_2(i) * \exp\left(-j\pi \frac{i}{2}\right);$$

The first resulting signal is thus obtained as:

$$\hat{Y}_1(i) = conj(X'_2(i))\breve{Y}(i) = H_1(i)M_1(i) + H_2(i)(-1)^{\frac{i}{2}} + \hat{n}_1(i)$$

where $M_1(i) = conj(X'_2(i))X_1(i)$. Assuming that channel remains constant over adjacent subcarriers, i, i+2, we get:

$$\hat{Y}_1(i) = H_1(i)M_1(i) + H_2(i)(-1)^{\frac{i}{2}} + \hat{n}_1(i)$$
$$\hat{Y}_1(i+2) = H_1(i)M_1(i+2) + H_2(i)(-1)^{\frac{i+2}{2}} + \hat{n}_1(i+2)$$

We then also multiply the received signal with $conj(X_1'(i))$ and do similar operations as above, the third resulting is $$\hat{Y}_2(i) = conj(X'_1(i))\breve{Y}(i) = H_2(i)M_2(i) + H_1(i)(-1)^{\frac{i}{2}} + \hat{n}_2(i)$$

where $M_1(i) = conj(X'_1(i))X_2(i)$. Assuming that channel remains constant over adjacent subcarriers, i, i+2, we get:

$$\hat{Y}_2(i) = H_2(i)M_2(i) + H_1(i)(-1)^{\frac{i}{2}} + \hat{n}_2(i)$$
$$\hat{Y}_2(i+2) = H_2(i)M_2(i+2) + H_1(i)(-1)^{\frac{i+2}{2}} + \hat{n}_2(i+2)$$

Action 504

By adding 504 the first resulting signals sequentially pairwise to form at least one third resulting signal and the second resulting signals sequentially pairwise to form at least one fourth resulting signal, we are able to cancel out the contribution from the interfering WT i.e. either the first WT 130 or the second WT 140.

Mathematically this is achieved by adding every two neighboring equations, the contribution from the second WT 140 is cancelled out, $$Y_1(i) = \hat{Y}_1(i) + \hat{Y}_1(i+2)$$
$$= H_1(i)\underbrace{(M_1(i) + M_1(i+2))}_{A_1(i)} + \underbrace{\hat{n}_1(i) + \hat{n}_1(i+2)}_{N_1(i)}$$

which gives the third resulting signal $Y_1(i)$. With the same operations for the second WT 140 to cancel out the contribution from the first WT 130, $$Y_2(i) = \hat{Y}_2(i) + \hat{Y}_2(i+2)$$
$$= H_2(i)\underbrace{(M_2(i) + M_2(i+2))}_{A_2(i)} + \underbrace{\hat{n}_2(i) + \hat{n}_2(i+2)}_{N_2(i)}$$

where $i = 0, 2, \ldots, N_{sc}^{rb}N_{rb} - 4$ we get the forth resulting signal $Y_2(i)$ Action 505

The signal power and/or noise power of the first or second reference signal is estimated based on the at least third resulting signal, the at least fourth resulting signal and the reference signal.

The estimation may be expressed as follows where the averaged power of $Y_1(i)$ and $Y_2(i)$ are:

$$P_1 = \frac{1}{N_{sc}^{rb}N_{rb}/2 - 1} \sum_{i=0}^{N_{sc}^{rb}N_{rb}-4} |Y_1(i)|^2$$

$$= \frac{\sum_{i=0}^{N_{sc}^{rb}N_{rb}-4} |A_1(i)|^2 |H_1(i)|^2}{N_{sc}^{rb}N_{rb}/2 - 1} + \sigma_N^2$$

$$P_2 = \frac{1}{N_{sc}^{rb}N_{rb}/2 - 1} \sum_{i=0}^{N_{sc}^{rb}N_{rb}-4} |Y_2(i)|^2$$

$$= \frac{\sum_{i=0}^{N_{sc}^{rb}N_{rb}-2} |A_1(i)|^2 |H_2(i)|^2}{N_{sc}^{rb}N_{rb}/2 - 1} + \sigma_N^2,$$

Please note that in practice $Y_1(i)$ and $Y_2(i)$ are determined and the expression after the last equal sign of each of the above equations for $P_1$ and $P_2$ is an alternative way of showing the inner workings of the average powers $P_1$ and $P_2$.

It is known that if the two WTs that are within the same cell using different cyclic shift, and they are completely overlapped in the frequency bandwidth, $|A_1(i)|$ is a constant number that is independent of $i$. i.e., $|A_1(i)|=|A|$ for all $i$, the average powers $P_1$ and $P_2$ can be simplified as $$P_1 = \frac{1}{N_{sc}^{rb}N_{rb}/2 - 1} \sum_{i=0}^{N_{sc}^{rb}N_{rb}-4} |Y_1(i)|^2$$

$$= |A|^2 \sigma_{H_1}^2 + \sigma_N^2$$

$$= |A|^2 \sigma_{H_1}^2 + 2\sigma_n^2$$

$$P_2 = \frac{1}{N_{sc}^{rb}N_{rb}/2 - 1} \sum_{i=0}^{N_{sc}^{rb}N_{rb}-4} |Y_2(i)|^2$$

$$= |A|^2 \sigma_{H_2}^2 + \sigma_N^2$$

$$= |A|^2 \sigma_{H_2}^2 + 2\sigma_n^2$$

Given the total received power:

$$P_{tot} = \sigma_{H_1}^2 + \sigma_{H_2}^2 + \sigma_n^2$$

the noise power $\sigma_n^2$ and signal power of each WT can be calculated from:

$$\begin{bmatrix} \sigma_{H_1}^2 & \sigma_{H_2}^2 & \sigma_n^2 \end{bmatrix}^T = \begin{bmatrix} 1 & 1 & 1 \\ |A|^2 & 0 & 2 \\ 0 & |A|^2 & 2 \end{bmatrix}^{-1} \begin{bmatrix} P_{tot} \\ P_1 \\ P_2 \end{bmatrix}$$

As the WTs are selected to fulfill the condition $|CS_1-CS_2| \neq 4$, so it is guaranteed that $|A|^2 \neq 2$ and the matrix is not singular.

With the above two embodiments for estimating the signal power and/or noise power of a reference signal the following can be tested with regards to the performance of the method.

In a scenario where there are two WTs and the SRS bandwidth is 12 RB, cyclic shift are separated by 4, i.e. $ICS$, $|CS_1-=CS_2|=4$. A cumulative density function of $|P_s-P_o|$ may be determined for different SNR values, where signal power values $P_s$ and $P_o$ may be filtered and reported to higher layer. $P_s$ is obtained by using any of the suggested methods but $P_o$ is from channel estimation. Degradation in the proposed methods of determining signal and/or noise power becomes significant only at very low SNRs, i.e., SNR<−8 dB. The cumulative density function gives the probability that the estimation of the signal power according to the proposed method is much worse than conventional signal power estimation, only gets noticeable at low SNRs.

If the BW is increased to 96 RBs i.e using more sub-carriers to estimate, the degradation of the proposed method is acceptable in most cases as compared to a full channel estimation.

Figure 7:
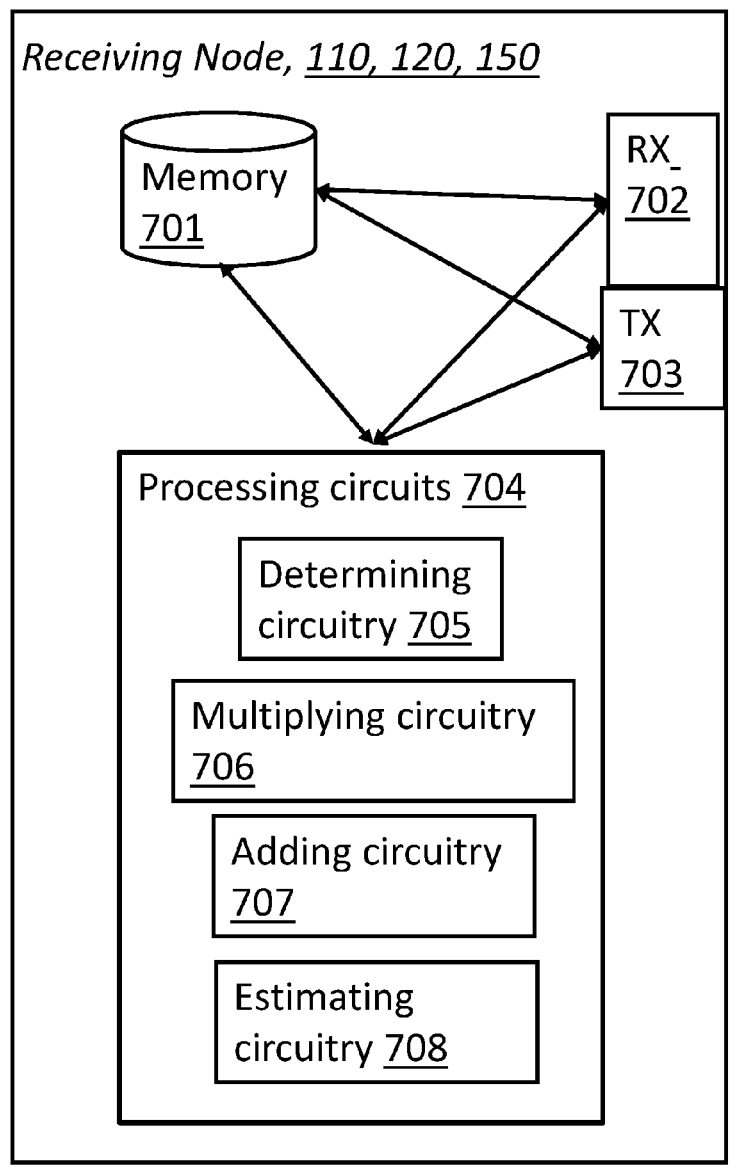
FIG. 7 is a schematic block diagram illustrating embodiments of a network node.

To perform the method actions in a receiving node 110, 120, 150 for use in a communications system applying frequency division multiplexing, configured to estimate a channel power and/or noise between the receiving node and a first transmitting node the receiving node 110, 120, 150 comprises the following arrangement depicted in FIG. 7. The receiving node 110, 120, 150 may be any of the base station 150, the first pico node 110 and the second pico node 120. It is also possible that some of the method actions are performed in another network node such as radio network controller or evolved controller just to mention a few.

The receiving node 110, 120, 150 comprises a transceiver circuit including a receiver 702 and a transmitter 703. The receiver 702 is configured to receive a reference signal comprising a first reference signal from a first wireless terminal and a second reference signal from a second wireless terminal.

The receiving node 110, 120, 150 further comprises processing circuits 704 for processing the received reference signals. The processing circuits 704 may be implemented by one or more processors, hardware, firmware, or a combination thereof. In one embodiment, the processing circuits 704 are configured to determine at least three sub-carriers on which the first and second reference signals are received. The determination may be performed by a determining circuitry 705.

The processing circuit 704 is further configured to, for each sub-carrier of the determined sub-carriers, multiply the reference signal with a conjugate based on the second reference signal to form a first resulting signal. The multiplication may be performed by a multiplying circuitry 706.

The processing circuit 704 is further configured to add the first resulting signals sequentially pairwise to form at least two second resulting signals. The addition may be performed by an adding circuitry 707.

The processing circuit 704 is further configured to add the second resulting signals sequentially pairwise to each other to obtain at least a third resulting signal. The addition may be performed by an adding circuitry 707.

The processing circuit 704 is configured to estimate the signal power and/or noise power of the first or second reference signal based on the third resulting signal, the second resulting signal and the reference signal. The estimation may be performed by an estimating circuitry 708.

The receiving node 110, 120, 150 may also comprise a receiver 702 wherein the receiver 702 is configured to receive a reference signal comprising a first reference signal from a first wireless terminal 130 and a second reference signal from a second wireless terminal 140.

The processing circuit 704 is further configured to determine at least two subcarriers on which the first and second reference signal is received. The determination may be performed by a determining circuitry 705.

The processing circuit 704 is further configured to, for each sub-carrier of the determined sub-carriers, multiply the reference signal with a conjugate based on the second reference signal to form a first resulting signal and to multiply the reference signal with a conjugate based on the first reference signal to form a second resulting signal. The multiplication may be performed by a multiplying circuitry 706.

The processing circuit 704 is further configured to add the first resulting signals sequentially pairwise to form at least one third resulting signal. The addition may be performed by an adding circuitry 707.

The processing circuit 704 is further configured to add the third resulting signals sequentially pairwise to form at least one fourth resulting signal. The addition may be performed by an adding circuitry 707.

The processing circuit 704 is further configured to estimate the signal power and/or noise power of the first or second reference signal based on the at least third resulting signal, the at least fourth resulting signal and the reference signal. The estimation may be performed by an estimating circuitry 708.

The embodiments herein for estimating signal and/or noise power may be implemented through one or more processing circuits 704, such as a processor, in the receiving node 110, 120, 150 as depicted in FIG. 7, together with computer program code for performing the functions and actions of the embodiments herein. The program code mentioned above may also be provided as a computer program product, for instance in the form of a non-transitory computer readable medium storing computer program code for performing the embodiments herein when being loaded into the first base station 150, the first pico station 110 or the second pico station 120. One such carrier may be in the form of a CD ROM disc. It is however feasible with other data carriers such as a memory stick. The computer program code may furthermore be provided as pure program code on a server and downloaded to the first base station 150, the first pico station 110 or the second pico station 120.

The first base station 150, the first pico station 110 and the second pico station 120 may further comprise a transmitter 703 in order to convey any information to another unit in relation to the embodiments described herein.

The first base station 150, the first pico station 110 and the second pico station 120 may further comprise a memory 701 comprising one or more memory units. The memory 701 is arranged to be used to store data, received data streams, received information, configurations, schedulings, and applications to perform the methods herein when being executed in the first base station 150, the first pico station 110 or the second pico station 120.

Those skilled in the art will also appreciate that the determining circuitry 705, the multiplying circuitry 706, the adding circuitry 707 or the estimating circuitry 708 described above may refer to a combination of analog and digital circuits, and/or one or more processors configured with software and/or firmware, e.g. stored in a memory, that when executed by the one or more processors such as the processor 704 perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

The invention claimed is:

1. A method for use in a receiving node of a communications system applying frequency division multiplexing, for estimating at least one of a signal power and a noise power of a received reference signal, the method comprising:
    receiving a combined reference signal for each of multiple sub-carriers, wherein each combined reference signal includes a combination of a first reference signal from a first wireless terminal and a second reference signal from a second wireless terminal,
    determining at least three sub-carriers on which the combined reference signal is received,
    multiplying the combined reference signal with a conjugate based on the second reference signal for each determined sub-carrier to obtain first resulting signals,
    adding the first resulting signals sequentially pairwise to form second resulting signals,
    adding the second resulting signals sequentially pairwise to form a third resulting signal,
    estimating at least one of a signal power and a noise power of at least one of the first reference signal and the second reference signal based on the third resulting signal, at least one of the second resulting signals and the combined reference signal, and
    selecting a receiving point of an uplink multi-sector cell or a wireless terminal for multi-user, multiple-input and multiple output (MU-MIMO) based on at least one of the signal power and the noise power estimates that provide increased robustness from multiple-interfering signal sources.

2. A method for use in a receiving node of a communications system applying frequency division multiplexing, for estimating at least one of a signal power and a noise power of a received reference signal, the method comprising:
    receiving a combined reference signal for each of multiple sub-carriers, wherein each combined reference signal includes a combination of a first reference signal from a first wireless terminal and a second reference signal from a second wireless terminal,
    determining subcarriers on which the combined reference signal is received,
    multiplying the combined reference signal with a conjugate based on the second reference signal for each determined sub-carrier to obtain first resulting signals,
    multiplying the combined reference signal with a conjugate based on the first reference signal for each determined sub-carrier to obtain second resulting signals,
    adding the first resulting signals sequentially pairwise to form a third resulting signal,
    adding the second resulting signals sequentially pairwise to form a fourth resulting signal,
    estimating at least one of a signal power and a noise power of at least one of the first reference signal and second reference signal based on the third resulting signal, the fourth resulting signal and the combined reference signal, and
    selecting a receiving point of an uplink multi-sector cell or a wireless terminal for multi-user, multiple-input and multiple output (MU-MIMO) based on at least one of the signal power and the noise power estimates that provide increased robustness from multiple-interfering signal sources.

3. The method according to claim 1 wherein, when the estimated noise power is higher than a threshold, estimating the signal power using a channel estimation.

4. The method according to claim 1 wherein, when the estimated noise power is higher than a threshold, time domain filtering the estimated signal power.

5. The method according to claim 1, wherein each of the first and second reference signals is a sounding reference signal.

6. The method according claim 1, wherein the channel is assumed to be constant over at least the first and second sub-carriers.

7. A receiving node for use in a communications system applying frequency division multiplexing, configured to estimate a channel between the receiving node and a first transmitting node, the receiving node comprising:
 a processing circuit,
 a receiver, and
 wherein:
  the receiver is configured to receive a combined reference signal for each of multiple sub-carriers, wherein each combined reference signal includes a combination of a first reference signal from a first wireless terminal and a second reference signal from a second wireless terminal, and
  the processing circuit is configured to:
   determine at least three sub-carriers on which the combined reference signal is received,
   multiply the combined reference signal with a conjugate based on the second reference signal for each determined sub-carrier to obtain first resulting signals,
   add the first resulting signals sequentially pairwise to form second resulting signals,
   add the second resulting signals sequentially pairwise to each other to obtain a third resulting signal,
   estimate at least one of a signal power a the noise power of at least one of the first reference signal and the second reference signal based on the third resulting signal, at least one of the second resulting signals and the combined reference signal, and
   select a receiving point of an uplink multi-sector cell or a wireless terminal for multi-user, multiple-input and multiple output (MU-MIMO) based on at least one of the signal power and the noise power estimates that provide increased robustness from multiple-interfering signal sources.

8. A receiving node for use in a communications system applying frequency division multiplexing, configured to estimate a channel between the receiving node and a first transmitting node, the receiving node comprising:
 a processing circuit,
 a receiver, and
 wherein:
  the receiver is configured to receive a combined reference signal for each of multiple sub-carriers, wherein each combined reference signal includes a combination of a first reference signal from a first wireless terminal and a second reference signal from a second wireless terminal, and
  the processing circuit is configured to:
   determine subcarriers on which the combined reference signal is received,
   multiply the combined reference signal with a conjugate based on the second reference signal for each determined sub-carrier to obtain first resulting signals,
   multiply the combined reference signal with a conjugate based on the first reference signal for each determined sub-carrier to obtain second resulting signals,
   add the first resulting signals sequentially pairwise to form a third resulting signal,
   add the second resulting signals sequentially pairwise to form a fourth resulting signal,
   estimate at least one of a signal power and a noise power of at least one of the first reference signal and the second reference signal based on the third resulting signal, the fourth resulting signal and the combined reference signal, and
   select a receiving point of an uplink multi-sector cell or a wireless terminal for multi-user, multiple-input and multiple output (MU-MIMO) based on at least one of the signal power and the noise power estimates that provide increased robustness from multiple-interfering signal sources.

* * * * *